US012014914B2

(12) United States Patent
Satoh

(10) Patent No.: US 12,014,914 B2
(45) Date of Patent: Jun. 18, 2024

(54) MASS SPECTRUM PROCESSING APPARATUS AND METHOD

(71) Applicant: JEOL Ltd., Tokyo (JP)

(72) Inventor: Takaya Satoh, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 17/503,682

(22) Filed: Oct. 18, 2021

(65) Prior Publication Data

US 2022/0122825 A1 Apr. 21, 2022

(30) Foreign Application Priority Data

Oct. 21, 2020 (JP) ................................ 2020-176453

(51) Int. Cl.
*H01J 49/00* (2006.01)

(52) U.S. Cl.
CPC ...... *H01J 49/0009* (2013.01); *H01J 49/0031* (2013.01); *H01J 49/0036* (2013.01)

(58) Field of Classification Search
CPC . H01J 49/0009; H01J 49/0031; H01J 49/0036
USPC .................. 250/281, 282; 702/22–24, 27, 28
See application file for complete search history.

(56) References Cited

U.S. PATENT DOCUMENTS

2018/0019110 A1* 1/2018 Kubo .................. H01J 49/0036

FOREIGN PATENT DOCUMENTS

| | | | |
|---|---|---|---|
| JP | 9210983 | A | 8/1997 |
| JP | 201790228 | A | 5/2017 |
| JP | 2017190982 | A | 10/2017 |
| JP | 20208314 | A | 1/2020 |

OTHER PUBLICATIONS

Hur et al., Statistically Significant Differences in Composition of Petroleum Crude Oils Revealed by Volcano Plots Generated from Ultrahigh Resolution Fourier Transform lon Cyclotron Resonance MAss Spectra, Energy Fuels, 2018, vol. 32, pp. 1206-1212.

Extended European Search Report issued in EP21202574.6 on Mar. 15, 2022.

Nakamura et al., Molecular Characterization of High Molecular Weight Polyesters by Matrix-Assisted Laser Desorption/Ionization High-Resolution Time-of-Flight Mass Spectrometry Combined with On-plate Alkaline Degradation and Mass Defect Analysis, Journal of the American Society for Mass Spectrometry; 2019; vol. 30; pp. 355-367.

* cited by examiner

*Primary Examiner* — Michael Maskell
(74) *Attorney, Agent, or Firm* — The Webb Law Firm

(57) ABSTRACT

A first peak list is generated based on a mass spectrum of a first polymer sample, and a second peak list is generated based on a mass spectrum of a second polymer sample. Based on the first peak list and the second peak list, a numerical value array (a differential value array, a ratio array) showing a difference between the peak lists is calculated. Based on the numerical value array and a correlated m/z array corresponding to the numerical value array, a KMD plot and an RKM plot are generated as a difference plot.

5 Claims, 12 Drawing Sheets

Comparative Example

FIG. 6

88

89 90 91 92

96 98 99 100

94

| m/z | Peak List A | Peak List B | Differential Value | ··· |
|---|---|---|---|---|
| M1 | M1A | M1B | M1D | ··· |
| M2 | M2A | M2B | M2D | ··· |
| M3 | M3A | M3B | M3D | ··· |
| M4 | M4A | M4B | M4D | ··· |
| ··· | ··· | ··· | ··· | ··· |

MASS SPECTRUM PROCESSING APPARATUS AND METHOD

CROSS REFERENCE TO RELATED APPLICATION

This application claims priority to Japanese Patent Application No. 2020-176453 filed Oct. 21, 2020, the disclosure of which is hereby incorporated by reference in its entirety.

BACKGROUND OF THE INVENTION

Field of the Invention

The present disclosure relates to a mass spectrum processing apparatus and method, and in particular to processing of two mass spectra acquired from two polymer samples to be compared.

Description of Related Art

For analysis of a polymer sample, a mass analysis system is used. In general, the mass analysis system comprises a mass analysis apparatus and a mass spectrum processing apparatus. With mass analysis of the polymer sample, a mass spectrum of the polymer sample is generated. In the mass spectrum, a plurality of peaks appear which correspond to a plurality of molecules having different degrees of polymerization. The entirety of the plurality of molecules forming a certain polymer or the entirety of a plurality of peaks included in a mass spectrum of a certain polymer may be called a polymer series.

As a method of analyzing the mass spectrum of the polymer sample, there is known a Kendrick mass defect (hereinafter also referred to as "KMD") analysis. With the KMD analysis, the KMD or a remainder of Kendrick mass (hereinafter also referred to as "RKM") is calculated, and a KMD plot or an RKM plot is generated based on the result of the calculation. The KMD analysis will be described later in detail.

Document 1 described below discloses the KMD plot. Document 2 described below discloses in FIG. 4 a volcano plot and the KMD plot. The volcano plot functions as a filter with respect to the KMD plot. Documents 1 and 2 do not disclose a plot showing a differential value array or a ratio array determined between two mass spectra.

There are cases in which comparison of mass spectra of two polymer samples is desired. For example, by comparing a mass spectrum of a polymer sample before degradation and a mass spectrum of a polymer sample after the degradation, a chemical change due to the degradation can be analyzed. Alternatively, by comparing a mass spectrum of a polymer sample generated by a first synthesis method and a mass spectrum of a polymer sample generated by a second synthesis method, it becomes possible to judge which of the synthesis methods is preferable.

In the comparison of the mass spectra of two polymer samples, a configuration may be considered in which two KMD plots generated from the mass spectra of the two polymer samples are drawn on the same coordinate system. However, in this case, two groups of elements of the two KMD plots entirely or partially overlap each other, resulting in difficulty in understanding a difference between the two KMD plots. It is also possible to separately create two KMD plots generated from the two polymer samples, and to compare and observe the KMD plots. However, in this case also, it is difficult to understand the difference between the two KMD plots. This problem may also arise when two RKM plots or two other plots are to be compared.

An advantage of the present disclosure lies in provision of a new plot which enables easy identification of a difference between two mass spectra acquired from two polymer samples.

CITATION LIST

Document 1: JP 2020-8314 A

Document 2: Manhoi Hur, et al., Statistically Significant Differences in Composition of Petroleum Crude Oils Revealed by Volcano Plots Generated from Ultrahigh Resolution Fourier Transform Ion Cyclotron Resonance Mass Spectra, Energy Fuels., Vol. 32, 2018, pp. 1206-1212.

SUMMARY OF THE INVENTION

According to one aspect of the present disclosure, there is provided a mass spectrum processing apparatus comprising: a calculator that calculates a numerical value array representing a difference between a first peak array which is acquired from a first mass spectrum of a first polymer sample and a second peak array which is acquired from a second mass spectrum of a second polymer sample, based on the first peak array and the second peak array; and a generator that generates a difference plot by placing a group of elements corresponding to the numerical value array with respect to a coordinate system defined by a first axis representing an integer mass calculated from a mass of a molecule as a whole and a second axis representing a fractional mass calculated from a mass of a portion in a molecule other than a primary chain.

According to another aspect of the present disclosure, there is provided a method of processing a mass spectrum, the method comprising: calculating a numerical value array representing a difference between a first peak array which is acquired from a first mass spectrum of a first polymer sample and a second peak array which is acquired from a second mass spectrum of a second polymer sample, based on the first peak array and the second peak array; and generating a difference plot by placing a group of elements corresponding to the numerical value array with respect to a coordinate system defined by a first axis representing a nominal Kendrick mass, and a second axis representing a Kendrick mass defect or a remainder of Kendrick mass.

BRIEF DESCRIPTION OF THE DRAWINGS

Embodiment(s) of the present disclosure will be described based on the following figures, wherein:

FIG. 6 is a diagram showing a table including two peak lists;

DESCRIPTION OF THE INVENTION

Figure 1:
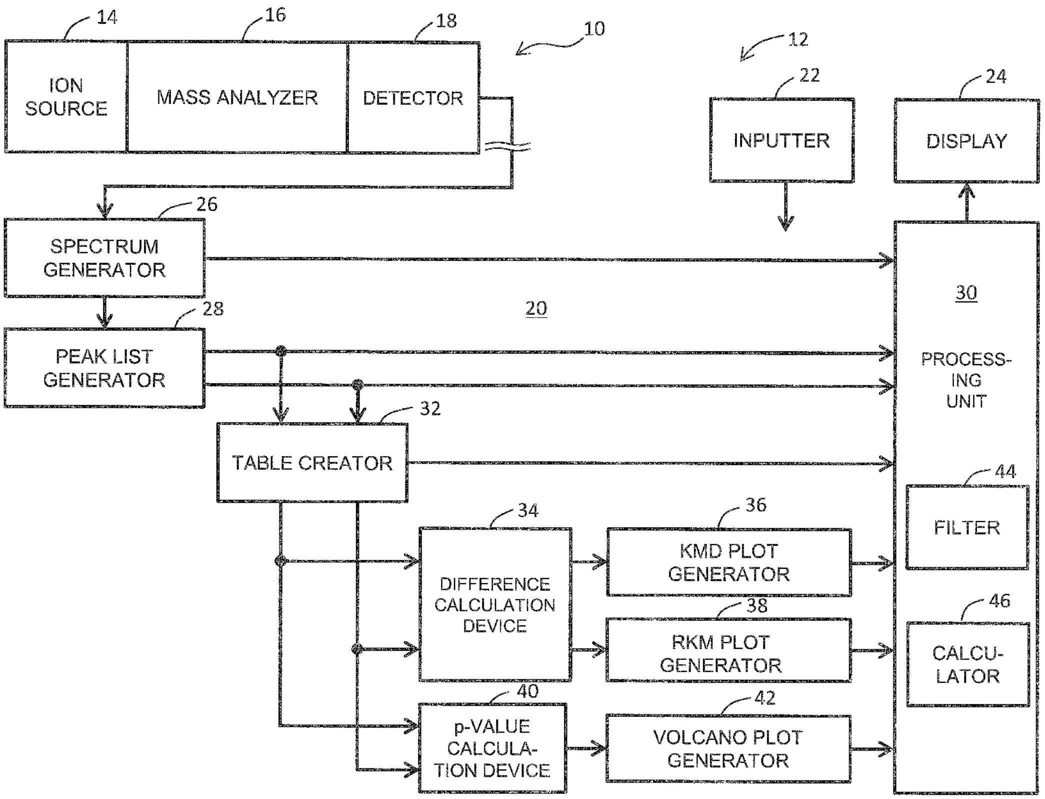
FIG. 1 is a block diagram showing a mass spectrum processing apparatus according to an embodiment of the present disclosure.

An embodiment of the present disclosure will now be described with reference to the drawings.

(1) Overview of Embodiment

A mass spectrum processing apparatus according to an embodiment of the present disclosure comprises a calculator and a generator. The calculator calculates a numerical value array representing a difference between a first peak array which is acquired from a first mass spectrum of a first polymer sample and a second peak array which is acquired from a second mass spectrum of a second polymer sample, based on the first peak array and the second peak array. The generator generates a difference plot by placing a group of elements corresponding to the numerical value array with respect to a coordinate system defined by a first axis representing an integer mass calculated from a mass of a molecule as a whole, and a second axis representing a fractional mass calculated from a mass of a portion in a molecule other than a primary chain.

When two groups of elements corresponding to two peak lists are placed with respect to a common coordinate system, an overlap occurs between the two groups of elements, and comparison between the two groups of elements (in particular, identification of a difference) becomes difficult. On the other hand, according to the above-described configuration, a numerical value array representing a difference between two peak arrays is calculated, and a group of elements are placed with respect to the coordinate system based on the numerical value array. Thus, the overlap in the above-described sense does not occur. That is, it becomes possible to clearly express the difference between the two peak lists. In other words, a plot can be acquired in which common parts between the two peak lists are removed, and a difference portion is emphasized.

In general, a polymer sample includes a plurality of polymers. Each individual polymer is a mixture formed from a plurality of molecules having different degrees of polymerization. Each molecule is formed from a primary chain and a portion other than the primary chain. A sequence of a plurality of repetitious units (monomers) is the primary chain. A number of the repetitious units in the primary chain is the degree of polymerization. The portion other than the primary chain is formed from an end group, an additional element, or the like.

In an embodiment of the present disclosure, an integer mass is calculated by applying conversion and integerization on the mass (observed mass) of the molecule as a whole. The conversion is a process in which the mass of the molecule as a whole is multiplied by a coefficient having an effect to convert a mass of a repetitious unit (monomer) into an integer value. The integerization is a process in which rounding is applied to a fractional numerical value. By subtracting the mass after the conversion from the integer mass, a fractional mass is determined. Alternatively, a mass of the portion other than the primary chain is divided by the repetitious unit, and a fraction of the value acquired thereby is determined as the fractional mass. The integer mass varies depending on the degree of polymerization. The fractional mass does not vary depending on the degree of polymerization, and corresponds to an odd amount viewed from the integer mass. Specifically, in an embodiment of the present disclosure, the integer mass is a nominal Kendrick mass. The fractional mass is a Kendrick mass defect or a remainder of Kendrick mass.

From another viewpoint, the first axis represents an overall mass calculated from the mass of the molecule as a whole. The overall mass varies depending on the degree of polymerization. The second axis represents an odd-amount mass calculated from the mass of the portion other than the primary chain in the molecule. The odd-amount mass does not vary depending on the degree of polymerization. In the coordinate system defined by the first axis and the second axis, a group of elements forming a polymer series is arranged at constant intervals along the first axis. The constant interval corresponds to the repetitious unit.

In an embodiment of the present disclosure, the generator changes a form of each element in the group of elements according to each of the numerical values in the numerical value array. According to this configuration, a magnitude of the difference between peaks is represented by a change of the form of each element. In an embodiment of the present disclosure, each element is a figure, and the change of the form of each element includes at least one of a size change, a brightness change, or a color phase change. According to this configuration, the magnitude of the difference between the peaks is represented by the size of the figure, the brightness change of the figure, the color phase change of the figure, or the like.

In an embodiment of the present disclosure, the calculator calculates the numerical value array by calculating a differential value between the first peak array and the second peak array, in units of peaks. In this configuration, for each m/z corresponding to at least one of the first peak and the second peak in a correspondence relationship, a differential value is calculated between an intensity of the first peak and an intensity of the second peak. When the other peak corresponding to one peak does not exist, the intensity of the other peak is set to 0 or a predetermined value.

In an embodiment of the present disclosure, the calculator calculates the numerical value array by calculating a ratio between the first peak array and the second peak array, in units of peaks. In this configuration, the magnitude relationship of the difference is represented in units of peaks by the ratio. In an embodiment of the present disclosure, a logarithm of the ratio is used.

In an embodiment of the present disclosure, the calculator executes a pre-process to supplement a numerical value other than zero to a value insufficiency location identified by a mutual comparison of the first peak array and the second peak array, and calculates the ratio after the pre-process. According to this configuration, it becomes possible to prevent a denominator from becoming 0 or a small value close to 0 in the calculation of the ratio, and to prevent a numerator from becoming 0 or a small value close to 0. The numerical value to be supplemented is a numerical value exceeding the small value close to 0, and is suitably determined according to the circumstances.

In an embodiment of the present disclosure, the mass spectrum processing apparatus further comprises: a generator device that generates a volcano plot based on a plurality of first peak arrays which are acquired from a plurality of first mass spectra of the first polymer sample, and a plurality of second peak arrays which are acquired from a plurality of second mass spectra of the second polymer sample; and a filter that extracts, from an entirety of elements in the difference plot, a plurality of elements corresponding to a plurality of significant elements belonging to an extraction area determined in the volcano plot, to thereby generate a filtered difference plot. According to this configuration, elements which are statistically significant may be left among the group of elements in the difference plot, or, in other words, elements that are not statistically significant may be discarded. A horizontal axis in the volcano plot represents a Fold Change (ratio), which is known, and a vertical axis in the volcano plot represents a p value, which is known.

A mass spectrum processing method according to an embodiment of the present disclosure comprises a calculation step and a generation step. In the calculation step, there is calculated a numerical value array which represents a difference between a first peak array which is acquired from a first mass spectrum of a first polymer sample and a second peak array which is acquired from a second mass spectrum of a second polymer sample, based on the first peak array and the second peak array. In the generation step, a difference plot is generated by placing a group of elements corresponding to the numerical value array with respect to a coordinate system defined by a first axis representing a nominal Kendrick mass, and a second axis representing a Kendrick mass defect or a remainder of Kendrick mass.

The mass spectrum processing method is realized as a function of hardware or a function of software. In the case of the latter, a program executing the mass spectrum processing method is installed into an information processor via a network or a transportable recording medium. The concept of the information processor includes a computer, a mass spectrum processing apparatus, a mass analysis apparatus, a mass analysis system, and the like. The information processor includes a non-transitory recording medium storing the program.

(2) Kendrick Mass Defect (KMD) Analysis

The KMD analysis will now be described. A mass (molecular weight) M of a polymer having a certain degree of polymerization n is represented, for example, as follows.

$$M=Mr\times n+Me+Mc \qquad \text{(Equation 1)}$$

The mass M may alternatively be called an observed mass. Here, Mr is an exact mass of the monomer, Me is a mass of the end group or the terminal group (a total of masses when two end groups are included in the molecule), and Mc is a mass of the additional portion when a cationizing agent is added prior to ionization. When z=1; that is, in the case of a valance of 1, the mass of each molecule is identified from a m/z (mass-to-charge ratio) of each peak in the mass spectrum.

The Kendrick mass (hereinafter also referred to as "KM") is defined as follows.

$$\text{KM}=M\times Mri/Mr \qquad \text{(Equation 2)}$$

Here, Mri is an integer mass of the monomer (repetitious unit). In Equation 2 described above, a coefficient (Mri/Mr) which is multiplied by the mass M of the polymer has an effect of converting the exact mass of the monomer (for example, 58.42) to the integer mass (for example, 58).

The right side of Equation 1 may be substituted for M in Equation 2, to derive the following.

$$KM=(Mr\times n+Me+\text{Mc})\times Mri/Mr \qquad \text{(Equation 3-1)}$$

$$=Mri\times n+(Me+\text{Mc})\times Mri/Mr \qquad \text{(Equation 3-2)}$$

$$=Mri\times n+(B+b) \qquad \text{(Equation 3-3)}$$

Here, Mri×n is an integer value. The capital letter "B" shows an integer portion in the term (Me+Mc)×Mri/Mr, and the small letter "b" shows a fractional portion in the term (Me+Mc)×Mri/Mr.

The nominal Kendrick Mass (hereinafter also referred to as "NKM") is an integer value acquired by applying rounding to the fractions of the KM (that is, b). More specifically, NKM is determined as follows.

$$NKM=Mr\times n+B+1\ (b\geq 0.5) \qquad \text{(Equation 4-1)}$$

$$=Mri\times n+B\ (b<0.5) \qquad \text{(Equation 4-2)}$$

The Kendrick mass defect (KMD) is defined as follows. The KMD corresponds to an insufficiency or a missing part from the integer value.

$$KMD=NKM-KM \qquad \text{(Equation 5-1)}$$

$$=1-b\ (b\geq 0.5) \qquad \text{(Equation 5-2)}$$

$$=-b\ (b<0.5) \qquad \text{(Equation 5-3)}$$

In the KMD analysis, a plurality of elements (for example, circles) corresponding to a plurality of peaks included in the mass spectrum of the polymer sample are placed with respect to a two-dimensional coordinate system defined by a horizontal axis representing the NKM and a vertical axis representing the KMD. With this process, a KMD plot is generated. For example, the intensity of each peak is represented by the size of each element. In the KMD plot, a plurality of elements corresponding to a plurality of peaks forming a polymer series are arranged at equal intervals and in parallel to the horizontal axis. The interval corresponds to the repetitious unit. In the KMD plot, the magnitude of the degree of polymerization does not affect the position in the vertical axis direction. In some documents, a simplified explanation is given that the integer portion of KM is the NKM. In general, KMD takes a value from −0.5 to 0.5.

Alternatively, a configuration may be employed in which a vertical axis representing a remainder of Kendrick mass (RKM) is employed in place of the vertical axis representing the KMD. In this case, an RKM plot is generated. The RKM is defined as follows.

$$\text{RKM}=\text{KM}/Mri-\text{Floor}(\text{KM}/Mri) \qquad \text{(Equation 6)}$$

Here, Floor(X) is an operator which rounds down fractions in X. Equation 3-2 described above is substituted for the KM in Equation 6, to yield the following.

$$\text{RKM}=\{n+(Me+Mc)/Mr\}-\text{Floor}\{n+(Me+Mc)/Mr\} \qquad \text{(Equation 7)}$$

In Equation 7, n may be deleted. Thus, the RKM may be represented as follows.

$$\text{RKM}=(Me+Mc)/Mr-\text{Floor}\{(Me+Mc)/Mr\} \qquad \text{(Equation 8)}$$

The RKM is a fraction in the value acquired by dividing a total value of the mass of the end group and the mass of the cationizing agent by the mass of the repetitious unit. The RKM is also a value which does not depend on the degree of polymerization n. In general, the RKM takes a value from 0 to 1.0.

A horizontal axis of the RKM plot represents the KM, and a vertical axis represents the RKM. In the RKM plot, similar to the KMD plot, a plurality of elements corresponding to the polymer series are arranged at equal intervals, in parallel to the horizontal axis.

(3) Details of Embodiment

FIG. 1 shows a mass analysis system according to an embodiment of the present disclosure. The mass analysis system is formed from a mass analysis apparatus 10 and a mass spectrum processing apparatus 12. In the present embodiment, a target of the mass analysis is a polymer sample. More specifically, the target is a first polymer sample and a second polymer sample. Mass analyses of the first polymer sample and the second polymer sample are sequentially performed. Each of the first polymer sample and the second polymer sample may include a plurality of polymers. In the following, the two samples including the first polymer sample and the second polymer sample may be collectively and simply called a sample in some cases.

The mass analysis apparatus 10 is formed from an ion source 14, a mass analyzer 16, and a detector 18. The ion source 14 is a device which ionizes the sample. In the present embodiment, the ion source 14 is an ion source which follows a soft ionization method such as MALDI (Matrix Assisted Laser Desorption/Ionization), ESI (Electrospray Ionization), or the like. With the use of the soft ion source, molecular ions of the polymer can be detected.

The mass analyzer 16 performs mass analysis of each individual ion based on m/z (mass-to-charge ratio) thereof. As the mass analyzer, a time-of-flight type mass analyzer, a quadrupole-type mass analyzer, or the like may be used. In the detector 18, ions exiting the mass analyzer 16 are detected. Alternatively, the detector 18 may be placed within the mass analyzer 16.

An analog detection signal indicating an ion amount for each m/z is output from the detector 18. The analog detection signal is sent to a signal processing circuit (not shown). In the signal processing circuit, the analog detection signal is converted to a digital detection signal.

In the present embodiment, the mass spectrum processing apparatus 12 is formed from a computer. The mass spectrum processing apparatus 12 comprises a processor 20, an inputter 22, and a display 24. The inputter 22 is formed from a keyboard, a pointing device, or the like. The display 24 is formed from an LCD or the like. The processor 20 is formed from a CPU which executes a program. In FIG. 1, a plurality of functions of the processor are represented by a plurality of blocks.

A spectrum generator 26 generates a mass spectrum of the sample based on the digital detection signal. In the present embodiment, in the spectrum generator 26, a first mass spectrum of a first polymer sample is generated based on a first digital detection signal acquired by a mass analysis of the first polymer sample. In addition, a second mass spectrum of a second polymer sample is generated based on a second digital detection signal acquired by a mass analysis of a second polymer sample. In each mass spectrum, a horizontal axis is an axis representing the m/z, and a vertical axis is an axis representing an intensity. Data indicating the first mass spectrum and data indicating the second mass spectrum are sent from the spectrum generator 26 to a peak list generator 28 and a processing unit 30.

The peak list generator 28 generates a first peak list based on a plurality of peaks included in the first mass spectrum. In addition, the peak list generator 28 generates a second peak list based on a plurality of peaks included in the second mass spectrum. The plurality of the peaks in the mass spectrum may be automatically detected and the peak list may be automatically generated, or the peak list may be generated by designation of a user of the plurality of peaks in the mass spectrum. Data indicating the first peak list and data indicating the second peak list are sent from the peak list generator 28 to a table creator 32 and the processing unit 30.

The table creator 32 has an alignment function to generate a predetermined table based on the first peak list and the second peak list. Specifically, based on the two peak lists, each m/z in which each peak occurs is identified, and a table is created in which a peak intensity is managed for each m/z. In the table, a plurality of peak pairs (a plurality of intensity pairs) are formed corresponding to a plurality of values of m/z.

The table creator 32 also has a function to execute a pre-process. The pre-process includes a value supplement process in which, with mutual comparison of the two peak lists, a value insufficiency location, in which there is no intensity or there is only an extremely small intensity, is identified, and a particular value (a relatively small value other than zero) is assigned to such a location. With this process, a problem may be avoided in which zero (or a value near zero) is substituted in a denominator or in a numerator in calculation of a ratio to be described later. After the value supplement process, the plurality of intensity pairs described above are formed. Data indicating the contents of the table are sent to a difference calculation device 34, a p-value calculation device 40, and the processing unit 30. In the following, m/z to which the intensity pair is correlated on the table will be referred to as a correlated m/z.

In the present embodiment, the difference calculation device 34 has two functions. A first function is a differential value calculating function, and a second function is a ratio calculating function. Specifically, the difference calculation device 34 calculates, for each correlated m/z, a differential value between two intensities correlated to the correlated m/z, based on the two intensities. For example, when the two intensities are MA and MB, MA-MB is calculated, or MB-MA is calculated. With this process, a plurality of differential values corresponding to the plurality of values of the correlated m/z are determined.

In addition, the difference calculation device 34 calculates, for each correlated m/z, a ratio between two intensities correlated to the correlated m/z, based on the two intensities. For example, when the two intensities are MA and MB, MA/MB is calculated, or MB/MA is calculated. With this process, a plurality of ratios corresponding to the plurality of values of the correlated m/z are determined. In reality, a logarithm of the ratio; that is, $\log_2(MA/MB)$ or $\log_2(MB/MA)$, is calculated. In this case, the sign of the value, either positive or negative, is determined based on a relationship in magnitudes of the ratios. Calculation results of the difference calculation device 34 are sent to a KMD plot generator 36 and an RKM plot generator 38.

The KMD plot generator 36 generates a KMD plot by placing a plurality of elements corresponding to the plurality of values of correlated m/z with respect to a coordinate system defined by a horizontal axis representing the NKM and a vertical axis representing the KMD. Each individual element is, for example a circle serving as a figure. With a color applied to the circle, the sign (positive or negative) for the difference is represented, and, with a size of the circle, a magnitude of the difference (magnitude of the difference or magnitude of the logarithm of the ratio) is represented.

A coordinate on the horizontal axis representing the NKM and a coordinate on the vertical axis representing the KMD are uniquely determined from the correlated m/z. That is, a position where each element is placed is unrelated to the difference or to the ratio. Factors related to the difference and the ratio are a form of the element (size, color phase, or the like). In the following, a KMD plot representing a plurality of differential values will be described as a differential value KMD plot, and a KMD plot representing a plurality of ratios will be referred to as a ratio KMD plot. Both of these plots are difference plots. Data indicating these plots are sent to the processing unit 30.

The RKM plot generator 38 generates an RKM plot by placing a plurality of elements corresponding to the plurality of values of correlated m/z with respect to a coordinate system defined by a horizontal axis representing the NKM and a vertical axis representing the RKM. Each individual element is, for example, a circle serving as a figure. With a color applied to the circle, a sign (either positive or negative) of the difference is represented, and, with a size of the circle, the magnitude of the difference (magnitude of the ratio or magnitude of the logarithm of the ratio) is represented.

A coordinate on the horizontal axis representing the NKM and a coordinate on the vertical axis representing the RKM are uniquely determined from the correlated m/z. A position where each individual element is placed is unrelated to the difference and the ratio. Factors related to the difference and the ratio are a form of the element (size, color phase, or the like). In the following, an RKM plot representing the plurality of differential values will be described as a differential value RKM plot, and an RKM plot representing the plurality of ratios will be described as a ratio RKM plot. Both plots are difference plots. Data indicating the RKM plots are sent to the processing unit 30.

The p-value calculation device 40 calculates a p value, which is known, based on three or more first peak lists acquired by performing the mass analysis three or more times on the first polymer sample, and three or more second peak lists acquired by performing the mass analysis three or more times on the second polymer sample. The p value is an evaluation value calculated in a t test.

Alternatively, of the differential value KMD plot, the ratio KMD plot, the differential value RKM plot, and the ratio RKM plot, one or a plurality of plots designated by a user may be generated. Alternatively, a pair of the differential value KMD plot and the ratio KMD plot, and a pair of the differential value RKM plot and the ratio RKM plot may be selectively generated.

A volcano plot generator 42 is a generation device which generates a volcano plot having a coordinate system defined by a horizontal axis representing the ratio and a vertical axis representing the p value. Specifically, the horizontal axis is an axis representing $\log_2(MA_{AVE}/MB_{AVE})$, and the vertical axis is an axis representing $-\log_{10}$(p-value). Based on a plurality of p values, a plurality of first intensity average values, and a plurality of second intensity average values corresponding to the plurality of values of correlated m/z, a plurality of points are placed on the above-described coordinate system, to thereby form a volcano plot. When a differential value between the first intensity average value and the second intensity average value forming a pair is greater than or equal to a certain value, the differential value is recognized as a significant value, and, when the p value is greater than or equal to a certain value, statistical significance is recognized. In consideration of these, an extraction area is set on the volcano plot, for extracting data which are significant. By identifying a plurality of original data corresponding to a plurality of points belonging to the area, a filter process is performed with respect to the KMD plot and the RKM plot. Data indicating the volcano plot are sent to the processing unit 30.

The processing unit 30 functions as a display processor and a calculator. The processing unit 30 has a color processing function, an image combining function, or the like. In addition, the processing unit 30 has a filter 44 and a calculator 46. The filter 44 extracts, from among a group of elements forming the KMD plot or the RKM plot, a plurality of elements corresponding to the plurality of points belonging to the extraction area in the volcano plot. With this process, a filtered KMD plot or a filtered RKM plot is generated. That is, in the KMD plot or the RKM plot, one or a plurality of sets of data (one or a plurality of elements) which are not significant in the comparison of two polymer samples are removed. With this process, the contents of the KMD plot or the RKM plot may be improved.

On the display 24, one or a plurality of plots are displayed among the differential value KMD plot, the ratio KMD plot, the differential value RKM plot, and the ratio RKM plot. In this case, the plot after the filtering is displayed as necessary. On the display 24, the two mass spectra, the two peak lists, or the like indicating the two polymer samples are also displayed. Alternatively, the KMD plot and the RKM plot generated based on the first peak list, and the KMD plot and the RKM plot generated based on the second peak list may be displayed.

For example, based on designation of a particular array of elements in the differential value KMD plot, a particular peak array may be identified from the mass spectrum of the first polymer sample, and an evaluation value may be calculated based on the particular peak array. Similarly, based on designation of a particular array of elements in the differential value KMD plot, a particular peak array may be identified from the mass spectrum of the second polymer sample, and an evaluation value may be calculated based on the particular peak array. As the evaluation value, there may be exemplified a total ion intensity, an average molecular weight, a polydispersity, or the like. The calculation of the evaluation value is executed by the calculator 46 in the example structure shown in the figure. Alternatively, two evaluation values calculated for two polymer samples may be compared to each other.

Figure 2:
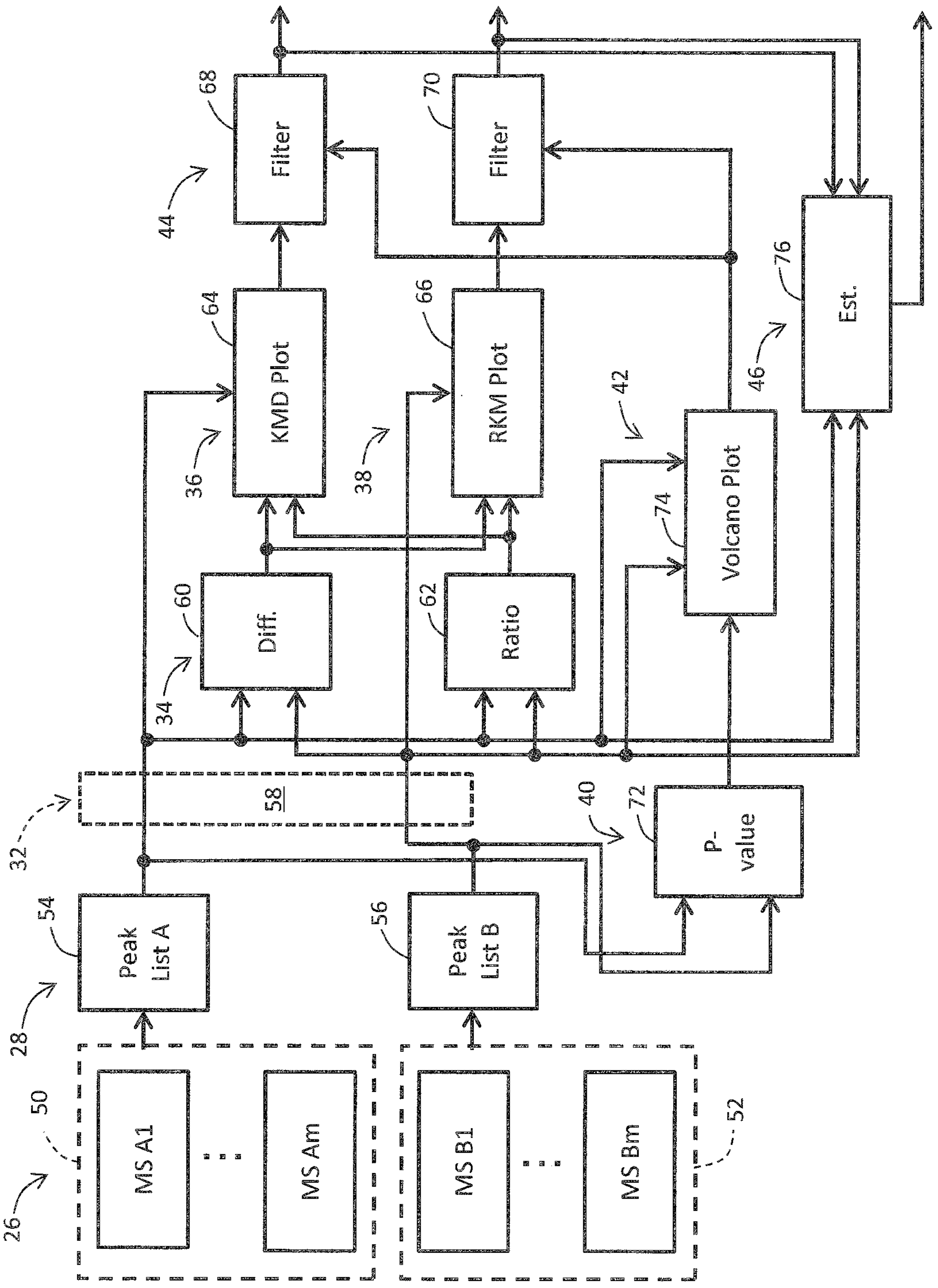
FIG. 2 is a block diagram showing a mass spectrum processing method according to an embodiment of the present disclosure.

FIG. 2 shows a mass spectrum processing method according to an embodiment of the present disclosure. More specifically, FIG. 2 shows an algorithm executed in the mass spectrum processing method.

In the spectrum generator 26, the first mass spectrum for the first polymer sample is generated. When a volcano plot 74 is generated, a group of first mass spectra 50 is generated, formed from three or more first mass spectra for the first polymer sample. Similarly, in the spectrum generator 26, a group of second mass spectra for the second polymer sample is generated. When the volcano plot 74 is generated, a group of second mass spectra 52 formed from three or more second mass spectra for the second polymer sample is generated.

In the peak list generator 28, a peak list 54 is automatically or manually generated based on the first mass spectrum. Similarly, a peak list 56 is automatically or manually generated based on the second mass spectrum. In the table creator 32, alignment is performed between the peak list 54 and the peak list 56. With this process, a table 58 is generated.

When the volcano plot 74 is generated, a group of first peak lists is generated based on the group of first mass spectra 50, and a first peak list is generated by averaging the group of first peak lists. Similarly, a group of second peak lists is generated based on the group of second mass spectra 52, and a second peak list is generated by averaging the group of second peak lists. The table 58 is generated based on the averaged first peak list and the averaged second peak list.

In the difference calculation unit 34, a differential value array 60 serving as a numerical value array is generated based on the first peak list after the alignment (or the averaged first peak list) and the second peak list after the alignment (or the averaged second peak list). The differential value array 60 is formed from a plurality of differential values corresponding to the plurality of values of correlated m/z.

In addition, in the difference calculation device 34, a ratio array 62 serving as a numerical value array is generated based on the first peak list after the alignment (or the averaged first peak list) and the second peak list after the alignment (or the averaged second peak list). The ratio array 62 is formed from a plurality of ratios (more accurately, a plurality of logarithms of the ratios) corresponding to the plurality of values of correlated m/z.

In the KMD plot generator 36, a KMD plot 64 is generated based on the differential value array; that is, a numerical value array. The KMD plot 64 is the differential value KMD plot. In addition, the KMD plot 64 is generated based on the ratio array; that is, a numerical value array. The KMD plot 64 is the ratio KMD plot.

In the RKM plot generator 38, an RKM plot 66 is generated based on the differential value array; that is, a numerical value array. The RKM plot 66 is the differential value RKM plot. In addition, an RKM plot 66 is generated based on the ratio array; that is, a numerical value array. The RKM plot 66 is the ratio RKM plot.

In the p-value calculation device 40, a p value 72 is calculated based on the group of the first peak lists and the group of the second peak lists. In the volcano plot generator 42, the volcano plot 74 is generated based on the p value, the averaged first peak list, and the averaged second peak list.

The filter 44 is formed from a first filter 68 and a second filter 70. At the first filter 68, the KMD plot 64 is filtered based on the contents of the volcano plot 74. At the second filter 70, the RKM plot 66 is filtered based on the contents of the volcano plot 74. In the calculator 46, one or a plurality of evaluation values 76 is/are calculated for a polymer series designated by the user.

A specific example configuration of the mass spectrum processing apparatus and the mass spectrum processing method described above will now be described.

Figure 3:
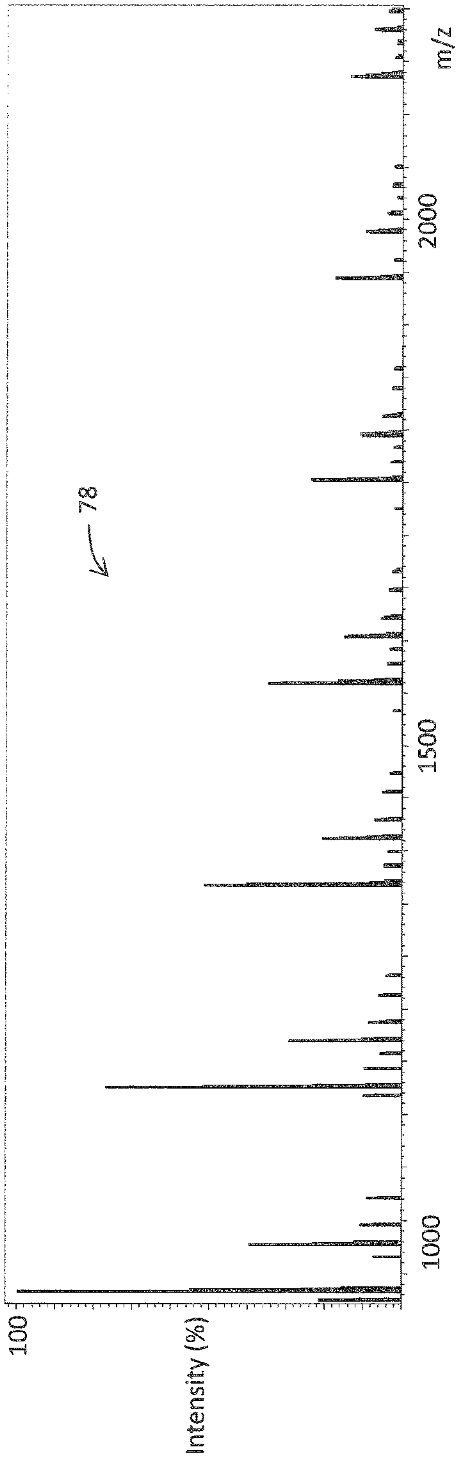
FIG. 3 is a diagram showing a mass spectrum of a first polymer sample.
Figure 4:
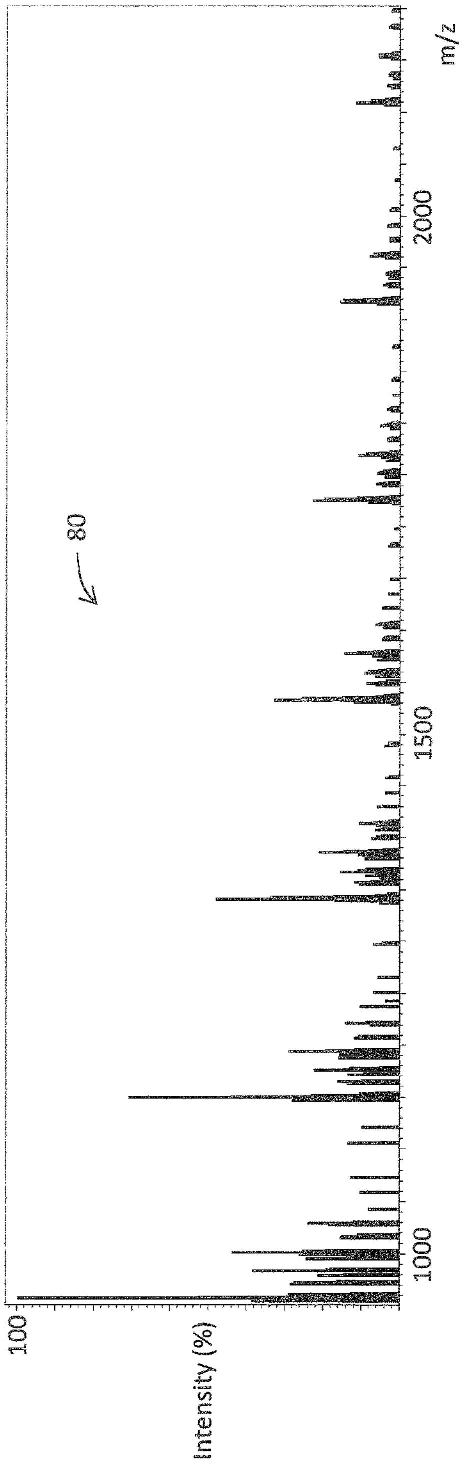
FIG. 4 is a diagram showing a mass spectrum of a second polymer sample.

FIG. 3 exemplifies a first mass spectrum 78 of the first polymer sample. FIG. 4 exemplifies a second mass spectrum 80 of the second polymer sample.

Figure 5:
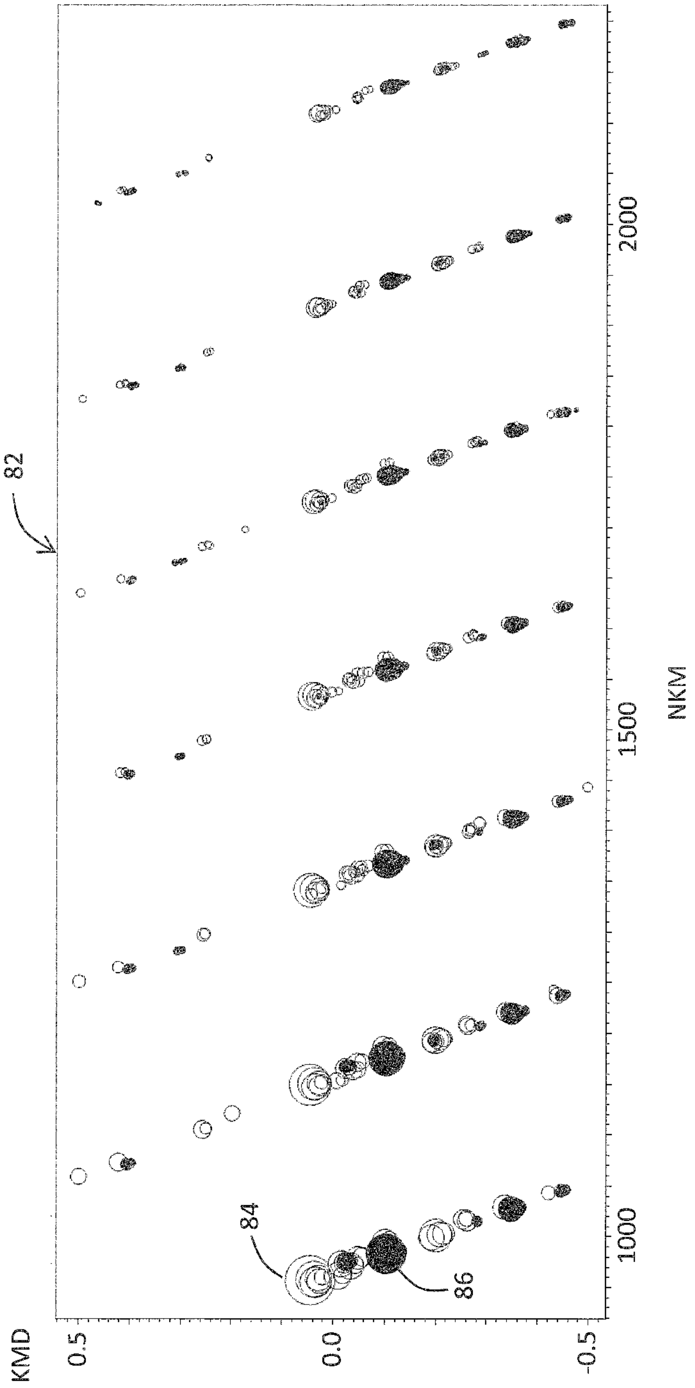
FIG. 5 is a diagram showing a KMD plot of a Comparative Example.

FIG. 5 shows a comparative example. That is, FIG. 5 shows a composite KMD plot 82 formed from a first KMD plot and a second KMD plot. The first KMD plot is generated based on the first mass spectrum 78 shown in FIG. 3, and the second KMD plot is generated based on the second mass spectrum 80 shown in FIG. 4. In the figure, a plurality of white circles 84 correspond to a plurality of peaks in the first mass spectrum, and a plurality of black circles 86 correspond to a plurality of peaks in the second mass spectrum. The horizontal axis represents the NKM and the vertical axis represents the KMD. The size of each circle represents peak intensity. A large number of overlaps exist between the plurality of white circles 84 and the plurality of black circles 86. In the composite KMD plot 82, it is not necessarily easy to clearly identify a difference between the two KMD plots.

FIG. 6 shows a table 88 created by the table creator. The table 88 includes an m/z array 89, a first intensity array (peak list A) 90, a second intensity array (peak list B) 91, and a differential value array 92. The m/z array 89 is formed from a plurality of values of correlated m/z. Each individual correlated m/z is an m/z of a peak when the peak occurs in at least one of the first mass spectrum or the second mass spectrum. When z=1 and fragmentation can be ignored, m/z corresponds to a mass of the molecule.

From another viewpoint, the table 88 is formed from a plurality of records 94, and each individual record 94 includes a correlated m/z 96, a first intensity 98, a second intensity 99, and a differential value 100. The differential value 100 is determined by subtracting the second intensity 99 from the first intensity 98. Further, the table 88 includes a ratio array. The differential value array 92 and the ratio array are numerical value arrays representing the difference between the mass spectra.

In the alignment, assuming the ratio calculation, a value insufficiency location in the first intensity array 90 and the second intensity array 91 is identified, and a predetermined value other than zero is supplemented to the value insufficiency location. With this process, in the ratio calculation, there may be avoided a situation in which the denominator becomes zero (or a very small value) or the numerator becomes zero (or a value very close to zero). The insufficiency location is, for example, a location with a value of zero or a location with a value less than or equal to a threshold. When only the difference calculation is performed, the supplementation of the predetermined value may be omitted.

Figure 7:
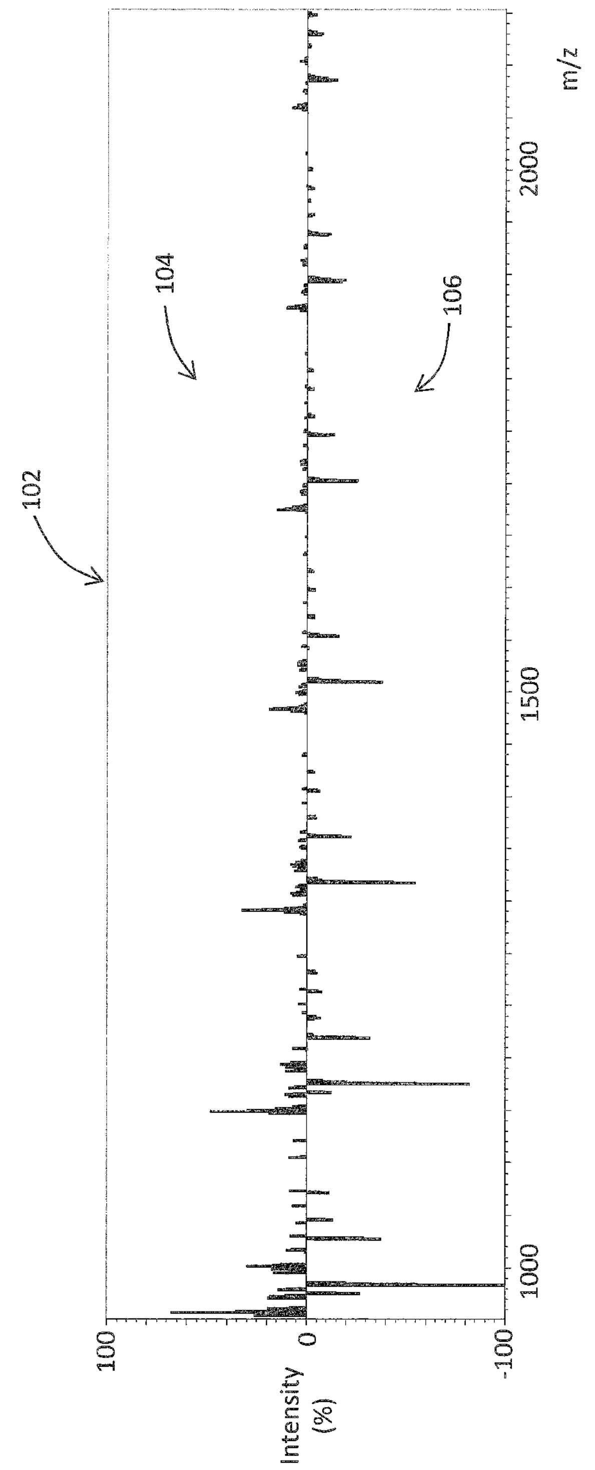
FIG. 7 is a diagram showing a differential value mass spectrum.

FIG. 7 shows a mass spectrum 102 corresponding to the differential value array. A mass spectrum portion 104 above a baseline shows a component on a positive side, and a mass spectrum portion 106 below the baseline shows a component on a negative side.

Figure 8:
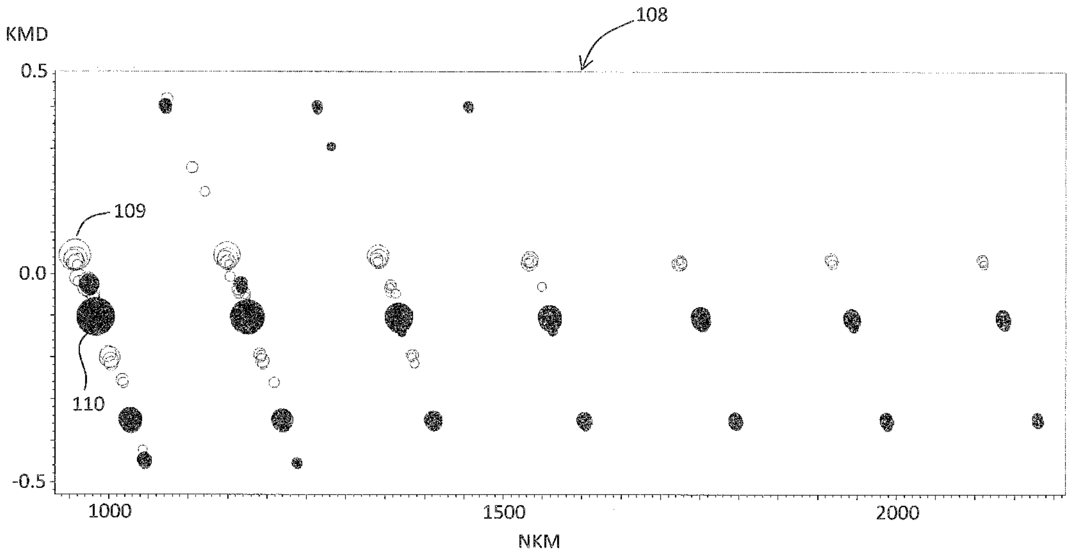
FIG. 8 is a diagram showing a difference plot according to an embodiment of the present disclosure.

FIG. 8 shows a KMD plot 108 which is one of the difference plots according to the present embodiment. The KMD plot 108 is a differential value KMD plot. The contents of the ratio KMD plot are similar to the contents of the differential value KMD plot.

The KMD plot 108 is formed from a plurality of elements corresponding to the plurality of values of correlated m/z. Each element is a circle. A positive component is represented with a white circle, and a negative component is represented with a black circle. The size of each circle represents the peak intensity. The plurality of white circles correspond to a plurality of positive-side peaks shown in FIG. 7, and the plurality of black circles correspond to a plurality of negative-side peaks shown in FIG. 7.

In FIG. 8, only the plurality of differential values are represented, and it is possible to clearly identify the difference between the first mass spectrum of the first polymer sample and the second mass spectrum of the second polymer sample, including the sign. When the first mass spectrum and the second mass spectrum completely match each other, the contents of the KMD plot 108 become empty. Advantages similar to those described above may be obtained when displaying the ratio KMD plot, the differential value RKM plot, and the ratio RKM plot. An alternative configuration may be considered in which a horizontal axis representing the molecular weight is employed in place of the horizontal axis representing the NKM.

Figure 9:
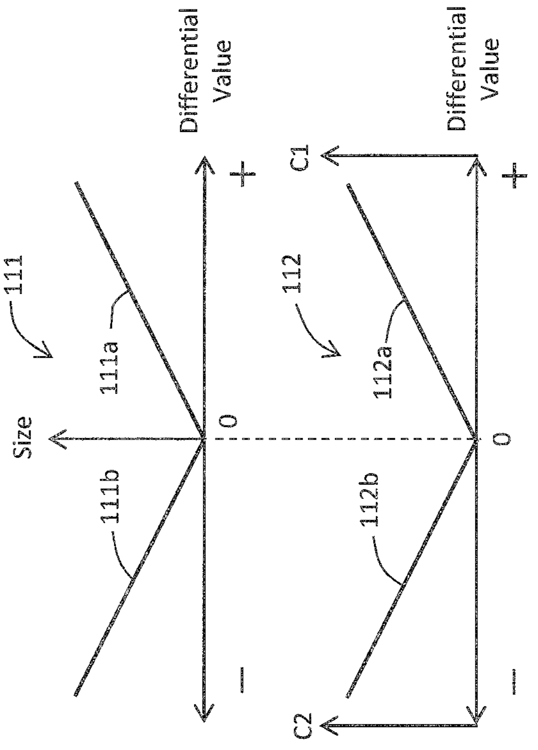
FIG. 9 is a diagram showing a size function and a color function.

FIG. 9 shows a size function 111 and a color function 112 which are referred to in a display process. A size, a color, and a brightness of the circle are determined based on the sign and the magnitude of the differential value. The size function 111 has a positive-side portion 111*a* and a negative-side portion 111*b*. As an absolute value of the differential value becomes larger, the size; that is, a diameter, of the circle is increased. The color function 112 has a positive-side portion 112*a* and a negative-side portion 112*b*. When the differential value is positive, C1 (for example, orange) is chosen as the color phase, and the brightness is determined by the color function 112. When the differential value is negative, C2 (for example, green) is chosen as the color phase, and the brightness is determined by the color function 112. The size function 111 and the color function 112 shown in FIG. 9 are exemplary. In any case, the sign of the differential value and the magnitude of the difference are reflected in the form of each element. This is similarly applicable to the case when the ratio is displayed. In FIG. 9, the differential value may be replaced with the ratio.

Figure 10:
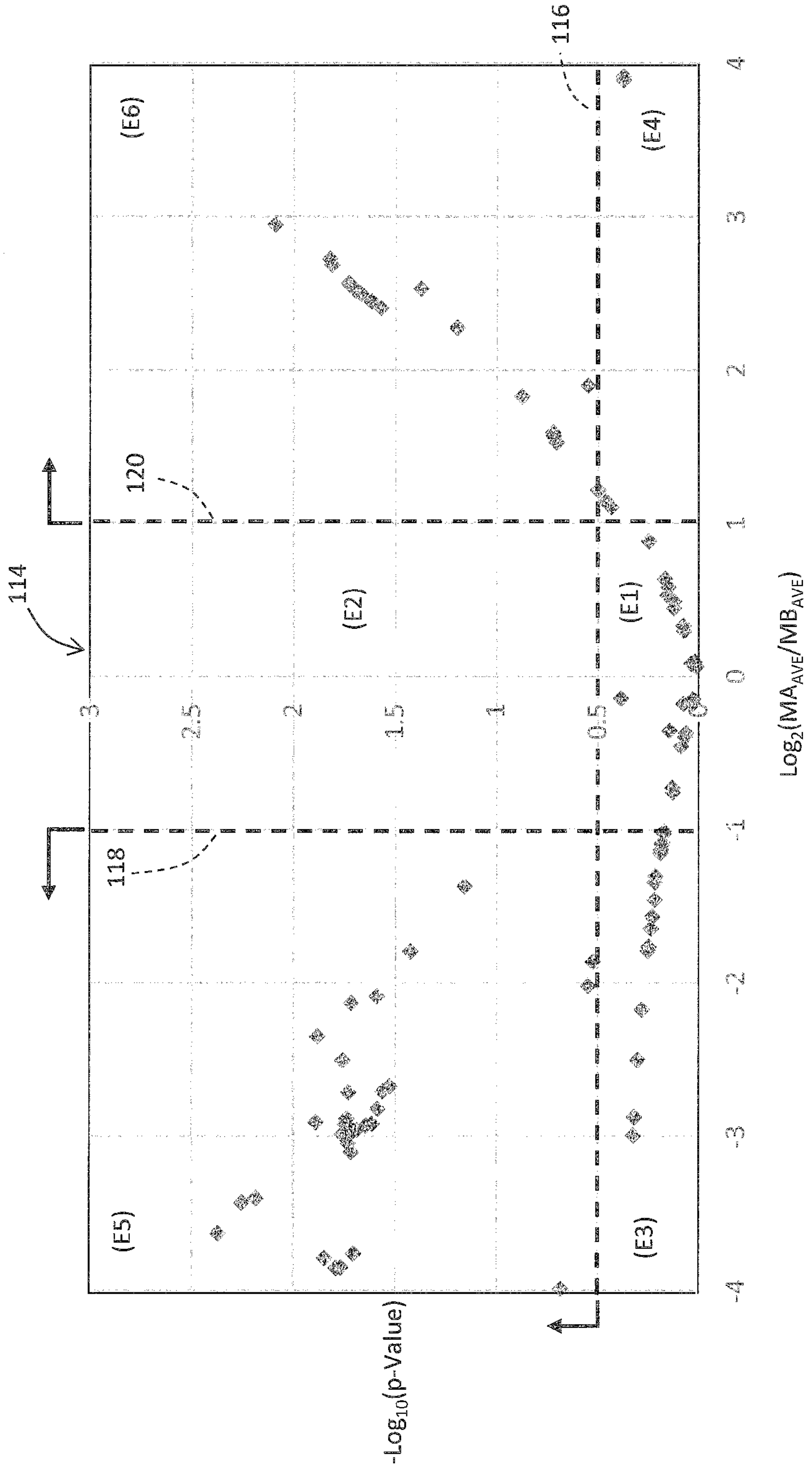
FIG. 10 is a diagram showing a volcano plot.

FIG. 10 shows a volcano plot 114 according to the present embodiment. The volcano plot itself is a known technique. A horizontal axis represents a ratio between an average of first peak intensities $MA_{AVE}$ and an average of second peak intensities $MB_{AVE}$, and more specifically shows $\log_2(MA_{AVE}/MB_{AVE})$. For example, a value of greater than or equal to +1 shown by a line 120, and a value of less than or equal to −1 shown by a line 118 are values that are significant. The vertical axis shows the p value, and more specifically shows $-\log_{10}$(p-value). For example, statistical significance may be recognized when the p value is greater than or equal to 0.5, as shown by a line 116.

In a coordinate system of the volcano plot 114, of areas E1~E6, areas E5 and E6 positioned at upper right and at upper left are extraction areas, and areas other than these areas are discard areas. A plurality of sets of data corresponding to a plurality of points belonging to the areas E5 and E6 are considered data that are significant.

Specifically, from the group of elements forming the KMD plot or the RKM plot, a plurality of elements corresponding to the plurality of points belonging to the areas E5 and E6 are identified, and the other elements are removed. With this process, a KMD plot after filtering or an RKM plot after filtering can be acquired.

Figure 11:
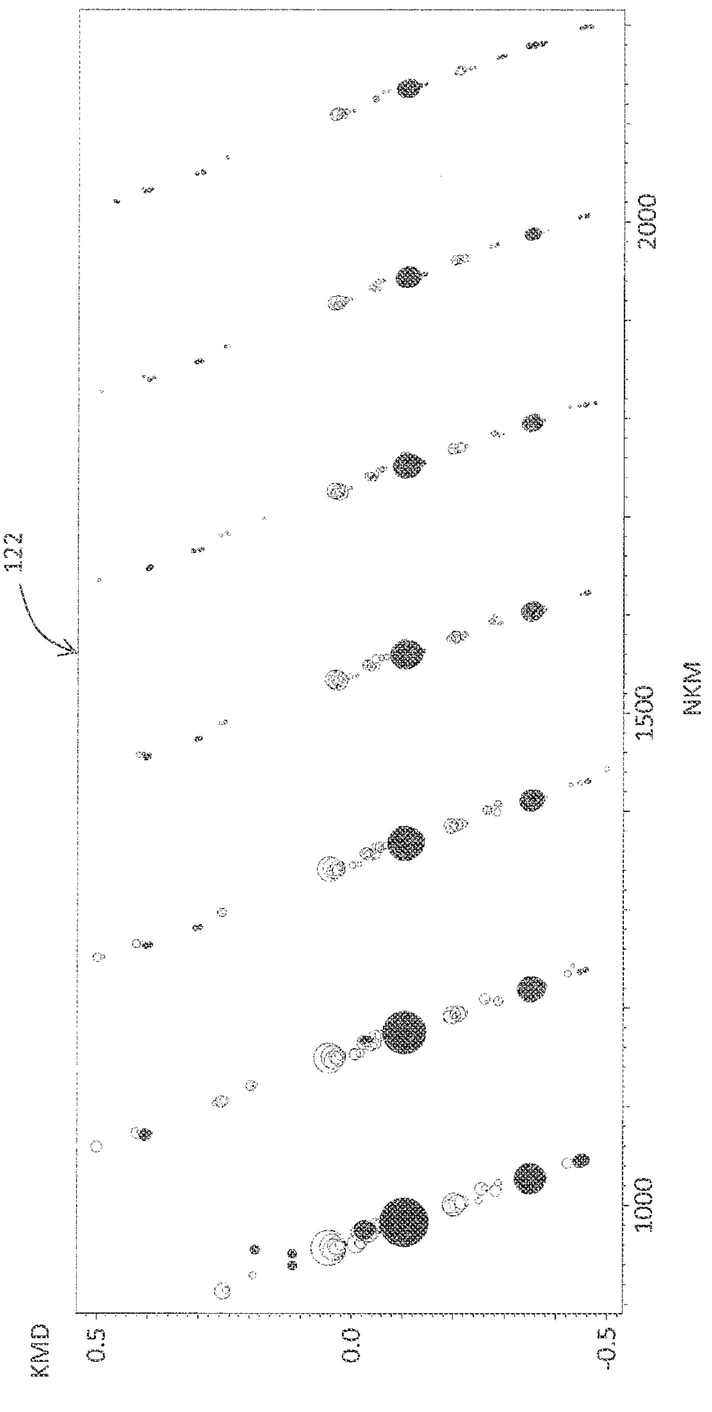
FIG. 11 is a diagram showing a difference plot before filtering.
Figure 12:
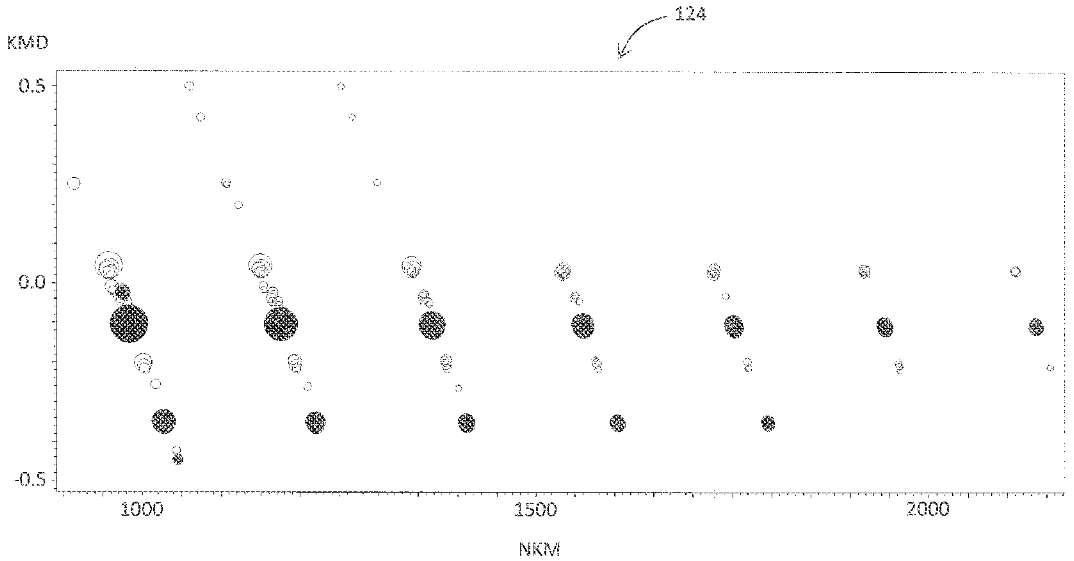
FIG. 12 is a diagram showing a difference plot after filtering.

FIG. 11 shows a KMD plot 122 before filtering. FIG. 12 shows a KMD plot 124 after the filtering. In the latter KMD plot 124, some elements included in the former KMD plot 122 are removed. With this configuration, the KMD plot 124 including a plurality of elements for which the statistical significance is assured can be acquired. In the RKM plot after the filtering also, a similar advantage can be obtained.

Figure 13:
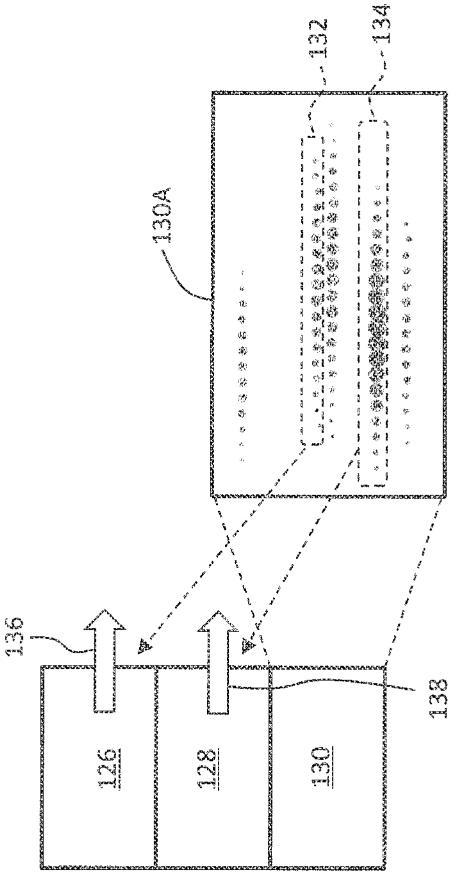
FIG. 13 is a diagram for explaining a selection of calculation target peaks.

FIG. 13 shows an example display. In the configuration illustrated in the figure, a mass spectrum 126 of the first polymer sample, a mass spectrum 128 of the second polymer sample, and a differential value KMD plot 130 are shown. A differential value KMD plot 130A is a specific example of the differential value KMD plot 130. The differential value KMD plot 130A includes a plurality of arrays of elements which are parallel to the horizontal axis, and particular element arrays 132 and 134 are designated by the user.

For example, based on the element array 132, a particular peak array in the mass spectrum 126 of the first polymer sample may be extracted, and, based on an intensity array of the peak array, one or a plurality of evaluation values may be calculated. Similarly, for example, based on the element array 134, a particular peak array in the mass spectrum 128 of the second polymer sample may be extracted, and, based on an intensity array of the peak array, one or a plurality of evaluation values may be calculated. As the evaluation values, there may be exemplified the ion intensity, the average molecular weight, the polydispersity, or the like. Alternatively, the evaluation value of the first polymer sample and the evaluation value of the second polymer sample may be compared to each other.

As described, according to the present embodiment, a new plot may be provided having a high practicality and in which a difference between two polymer samples is expressed.

The invention claimed is:

1. A mass spectrum processing apparatus comprising a processor configured to:

generate a first mass spectrum based on a first detection signal acquired by a mass analysis of a first polymer sample generated by a first synthesis method and a second mass spectrum based on a second detection signal acquired by a mass analysis of a second polymer sample generated by a second synthesis method;

generate a first peak list from the first mass spectrum and a second peak list from the second mass spectrum;

calculate a numerical value array representing a difference between the first peak list and the second peak list based on the first peak list and the second peak list;

calculate, for each numerical value of the numerical value array, an integer mass from a mass of a molecule as a whole and a fractional mass from a mass of a portion in a molecule other than a primary chain, based on the numerical value array, thereby calculating integer masses and fractional masses;

generate a difference plot by placing a group of elements corresponding to the numerical value array with respect to a coordinate system defined by a horizontal axis representing the integer mass, and a vertical axis representing the fractional mass, based on the integer masses and the fractional masses;

wherein the numerical value array is generated by calculating differential values or ratios between the first peak list and the second peak list so as to identify a difference between the first polymer sample and the second polymer sample to be compared, wherein the integer mass is a nominal Kendrick mass, the fractional mass is a Kendrick mass defect, each element in the group is a figure, wherein a color of the figure represents a sign of a numerical value corresponding to that element and a size of the figure represents a magnitude of the numerical value corresponding to that element; and change, for each numerical value in the numerical value array, the color and the size of the figure according to each numerical value in the numerical value array, wherein the first polymer sample includes a plurality of first polymers, the second polymer sample includes a plurality of second polymers, the group of elements in the difference plot includes a plurality of element arrays which are parallel to the horizontal axis, the plurality of element arrays represents differences between the plurality of first polymers and the plurality of second polymers, and the differences are caused by a difference between the first synthesis method and the second synthesis method, wherein either the first synthesis method or the second synthesis method is determined as a preferred synthesis method based on the plurality of element arrays, when a particular element array is designated from the plurality of element arrays so as to identify in detail one of the differences caused by the difference between the first synthesis method and the second synthesis method, the processor is configured to:

extract a first particular peak array from the first mass spectrum for the first polymer sample and a second particular peak array from the second mass spectrum for the second polymer sample based on the particular element array, the first particular peak array corresponding to a first particular polymer in the first polymers generated by the first synthesis method, and the second particular peak array corresponding to a second particular polymer in the second polymers generated by the second synthesis method;

calculate an first evaluation value based on the first particular peak array and a second evaluation value based on the second particular peak array, the first evaluation value including at least one of a total ion intensity, an average molecular weight and a polydispersity of the first particular polymer, and the second evaluation value including at least one of a total ion intensity, an average molecular weight and a polydispersity of the second particular polymer; and compare the first evaluation value and the second evaluation value so as to identify a difference between the first particular polymer generated by the first synthesis method and the second particular polymer generated by the second synthesis method.

2. The mass spectrum processing apparatus according to claim 1, wherein a calculator:

executes a pre-process to supplement a numerical value exceeding a predetermined value to a value insufficiency location identified by a mutual comparison of the first peak list and the second peak list; and calculates a ratio after the pre-process.

3. The mass spectrum processing apparatus according to claim 1, further comprising:

a generation device that generates a volcano plot based on a plurality of first peak lists which are acquired from a plurality of first mass spectra of the first polymer sample, and a plurality of second peak lists which are acquired from a plurality of second mass spectra of the second polymer sample; and a filter that extracts, from an entirety of elements in the difference plot, a plurality of elements corresponding to a plurality of significant elements belonging to an extraction area determined in the volcano plot, to thereby generate a filtered difference plot.

4. A method of processing a mass spectrum, the method comprising:

generating a first mass spectrum based on a first detection signal acquired by a mass analysis of a first polymer sample generated by a first synthesis method and a second mass spectrum based on a second detection signal acquired by a mass analysis of a second polymer sample generated by a second synthesis method;

generating a first peak list from the first mass spectrum and a second peak list from the second mass spectrum;

calculating a numerical value array representing a difference between the first peak list which is acquired from a first mass spectrum of a first polymer sample and the second peak list which is acquired from a second mass spectrum of a second polymer sample, based on the first peak list and the second peak list, wherein the first polymer sample and the second polymer sample are polymer samples before and after a chemical change, or polymer samples generated by different synthesis methods;

calculating, for each numerical value of the numerical value array, an integer mass from a mass of a molecule as a whole and a fractional mass from a mass of a portion in a molecule other than a primary chain, based on the numerical value array, thereby calculating integer masses and fractional masses;

generating a difference plot by placing a group of elements corresponding to the numerical value array with respect to a coordinate system defined by a horizontal axis representing a nominal Kendrick mass, and a vertical axis representing a Kendrick mass defect or a remainder of Kendrick mass, wherein the numerical value array is generated by calculating differential values or ratios between the first peak list and the second peak list so as to identify a difference between the first polymer sample and the second polymer sample to be compared, each element in the group is a figure, wherein a color of the figure represents a sign of a numerical value corresponding to that element and a size of the figure represents a magnitude of the numerical value corresponding to that element; and changing, for each numerical value in the numerical value array, the color and the size of the figure according to each numerical value in the numerical value array, wherein the first polymer sample includes a plurality of first polymers, the second polymer sample includes a plurality of second polymers, the group of elements in the difference plot includes a plurality of element arrays which are parallel to the horizontal axis, the plurality of element arrays represents differences between the plurality of first polymers and the plurality of second polymers, and the differences are caused by a difference between the first synthesis method and the second synthesis method, wherein either the first synthesis method or the second synthesis method is determined as a preferred synthesis method based on the plurality of element arrays, when a particular element array is designated from the plurality of element arrays so as to identify in detail one of the differences caused by the difference between the first synthesis method and the second synthesis method, the method further comprises:

extracting a first particular peak array from the first mass spectrum for the first polymer sample and a second particular peak array from the second mass spectrum for the second polymer sample based on the particular element array, the first particular peak array corresponding to a first particular polymer in the first polymers generated by the first synthesis method, and the second particular peak array corresponding to a second particular polymer in the second polymers generated by the second synthesis method;

calculating an first evaluation value based on the first particular peak array and a second evaluation value based on the second particular peak array, the first evaluation value including at least one of a total ion intensity, an average molecular weight and a polydispersity of the first particular polymer, and the second evaluation value including at least one of a total ion intensity, an average molecular weight and a polydispersity of the second particular polymer; and comparing the first evaluation value and the second evaluation value so as to identify a difference between the first particular polymer generated by the first synthesis method and the second particular polymer generated by the second synthesis method.

5. A non-transitory recording medium storing a program executed by an information processor, wherein, when executed by the information processor, the program causes the information processor to:

generate a first mass spectrum based on a first detection signal acquired by a mass analysis of a first polymer sample generated by a first synthesis method and a second mass spectrum based on a second detection signal acquired by a mass analysis of a second polymer sample generated by a second synthesis method;

generate a first peak list from the first mass spectrum and a second peak list from the second mass spectrum;

calculate a numerical value array representing a difference between the first peak list and the second peak list based on the first peak list and the second peak list;

calculate, for each numerical value of the numerical value array, an integer mass from a mass of a molecule as a whole and a fractional mass from a mass of a portion in a molecule other than a primary chain, based on the numerical value array, thereby calculating integer masses and fractional masses;

generate a difference plot by placing a group of elements corresponding to the numerical value array with respect to a coordinate system defined by a horizontal axis representing the integer mass, and a vertical axis representing the fractional mass, based on the integer masses and the fractional masses;

wherein the numerical value array is generated by calculating differential values or ratios between the first peak list and the second peak list so as to identify a difference between the first polymer sample and the second polymer sample to be compared, wherein the integer mass is a nominal Kendrick mass, the fractional mass is a Kendrick mass defect, each element in the group is a figure, wherein a color of the figure represents a sign of a numerical value corresponding to that element and a size of the figure represents a magnitude of the numerical value corresponding to that element; and change, for each numerical value in the numerical value array, the color and the size of the figure according to each numerical value in the numerical value array, wherein the first polymer sample includes a plurality of first polymers, the second polymer sample includes a plurality of second polymers, the group of elements in the difference plot includes a plurality of element arrays which are parallel to the horizontal axis, the plurality of element arrays represents differences between the plurality of first polymers and the plurality of second polymers, and the differences are caused by a difference between the first synthesis method and the second synthesis method, wherein either the first synthesis method or the second synthesis method is determined as a preferred synthesis method based on the plurality of element arrays, when a particular element array is designated from the plurality of element arrays so as to identify in detail one of the differences caused by the difference between the first synthesis method and the second synthesis method, the processor is configured to:

extract a first particular peak array from the first mass spectrum for the first polymer sample and a second particular peak array from the second mass spectrum for the second polymer sample based on the particular element array, the first particular peak array corresponding to a first particular polymer in the first polymers generated by the first synthesis method, and the second particular peak array corresponding to a second particular polymer in the second polymers generated by the second synthesis method;

calculate an first evaluation value based on the first particular peak array and a second evaluation value based on the second particular peak array, the first evaluation value including at least one of a total ion intensity, an average molecular weight and a polydispersity of the first particular polymer, and the second evaluation value including at least one of a total ion intensity, an average molecular weight and a polydispersity of the second particular polymer; and compare the first evaluation value and the second evaluation value so as to identify a difference between the first particular polymer generated by the first synthesis method and the second particular polymer generated by the second synthesis method.

* * * * *